United States Patent
Schmitz

(10) Patent No.: US 6,269,632 B1
(45) Date of Patent: Aug. 7, 2001

(54) METHOD OF OPERATING AN EXTERNALLY IGNITED INTERNAL-COMBUSTION ENGINE HAVING A REGULATED EXHAUST CATALYST AND ELECTROMAGNETICALLY OPERATED CYLINDER VALVES

(75) Inventor: Günter Schmitz, Aachen (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 09/311,864

(22) Filed: May 14, 1999

(30) Foreign Application Priority Data

May 22, 1998 (DE) ............................................. 198 23 021

(51) Int. Cl.$^7$ ..................................................... F01N 3/00
(52) U.S. Cl. ................................. 60/274; 60/277; 60/285; 123/479; 123/481; 123/90.11
(58) Field of Search ............................... 60/274, 285, 277, 60/276; 123/198 F, 479, 481, 90.11, 90.15, 90.17, 406.14, 630

(56) References Cited

U.S. PATENT DOCUMENTS

| | | | |
|---|---|---|---|
| 5,241,937 | * 9/1993 | Kanehiro et al. | 123/425 |
| 5,398,502 | * 3/1995 | Watanabe | 60/284 |
| 5,494,008 | * 2/1996 | Ohkawa et al. | 123/90.17 |
| 5,623,896 | * 4/1997 | Kato et al. | 123/90.15 |
| 5,765,514 | * 6/1998 | Sono et al. | 123/90.11 |
| 5,848,529 | * 12/1998 | Katoh et al. | 60/274 |
| 5,964,192 | * 10/1999 | Ishii | 123/90.11 |
| 6,055,948 | * 5/2000 | Shiraishi et al. | 123/90.15 |

\* cited by examiner

*Primary Examiner*—Thomas Denion
*Assistant Examiner*—Binh Tran
(74) *Attorney, Agent, or Firm*—Venable; Gabor J. Kelemen

(57) ABSTRACT

A method of operating an externally-ignited internal-combustion engine which includes a plurality of engine cylinders each provided with cylinder valves, an ignition device, a fuel injection device and an electromagnetic valve drive for operating the cylinder valves, and which further includes an electronic engine control for controlling the cylinder valves, includes the following steps: monitoring the operation of the ignition device and/or the fuel injection device of each cylinder; and, during cold start and/or when a spark failure and/or an ignition failure is detected in one of the cylinders during the monitoring step, adapting the control of the electromagnetic valve drives of that cylinder to the changed operational conditions.

8 Claims, 2 Drawing Sheets

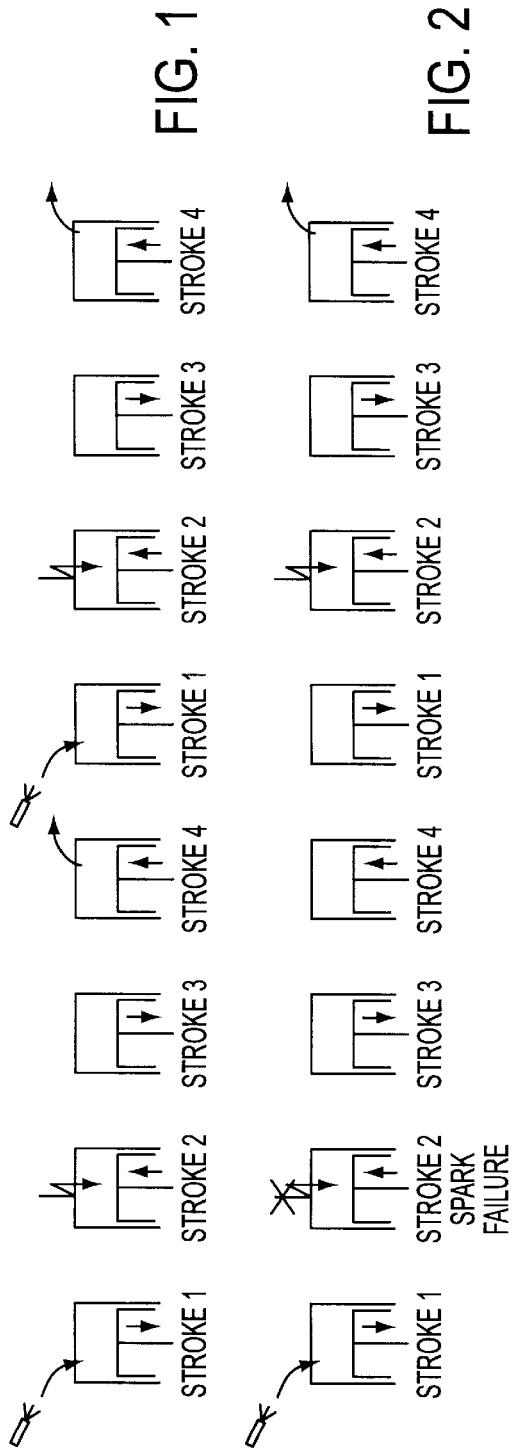
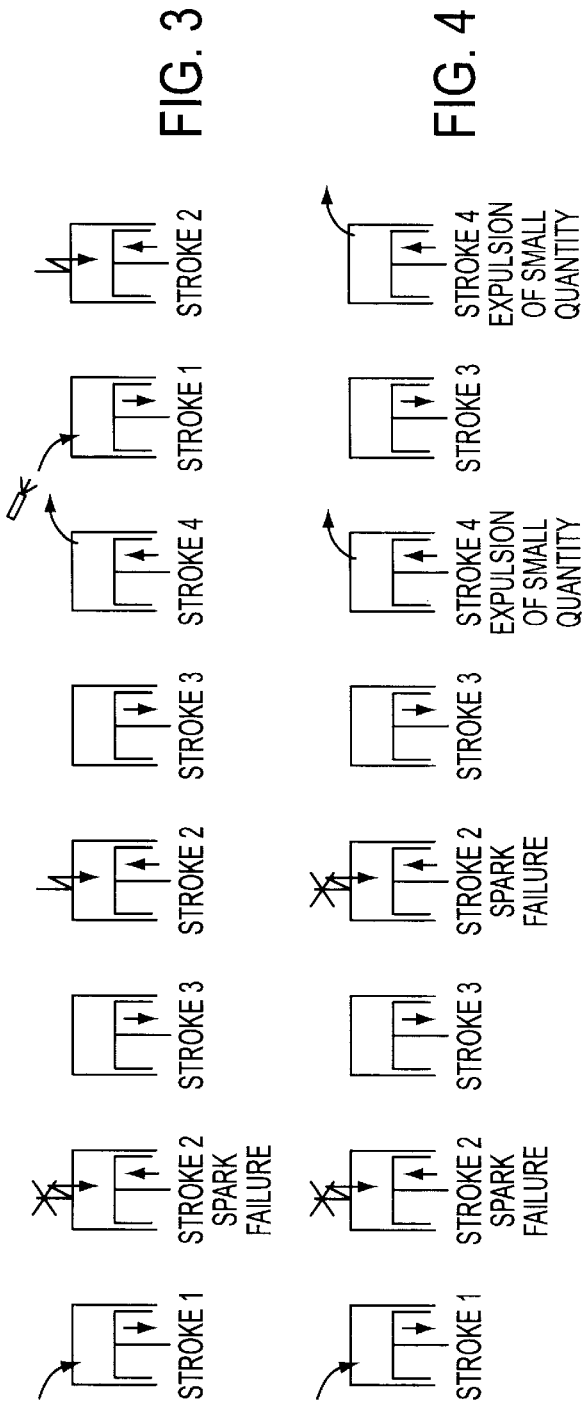

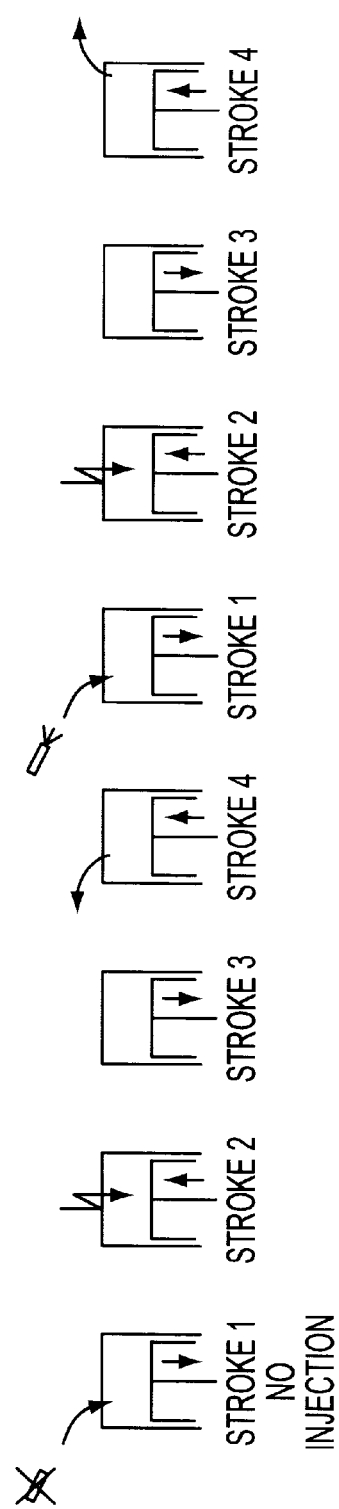

METHOD OF OPERATING AN EXTERNALLY IGNITED INTERNAL-COMBUSTION ENGINE HAVING A REGULATED EXHAUST CATALYST AND ELECTROMAGNETICALLY OPERATED CYLINDER VALVES

CROSS REFERENCE TO RELATED APPLICATION

This application claims the priority of German Application No. 198 23 021.4 filed May 22, 1998, which is incorporated herein by reference.

BACKGROUND OF THE INVENTION

The invention relates to a method of operating an externally ignited, piston-type internal-combustion engine having electromagnetic valve drives for operating the cylinder valves which are fully variably controllable by an electronic engine control for adapting their timing to varying operational conditions. The engine further has a fuel injection device for the individual cylinders.

In internal-combustion engines of the above-outlined type an ignition failure may cause damage to an exhaust gas catalyst of the engine, because an uncombusted charge is admitted to the exhaust gas system. In case of an injection failure, unintended air is admitted to the exhaust gas system, causing the catalyst control to enrich the fuel supplied to the other cylinders. Such an occurrence may have an adverse effect on the emission and also on the catalyst.

SUMMARY OF THE INVENTION

It is an object of the invention to provide an improved method of the above-outlined type which eliminates the discussed disadvantages.

This object and others to become apparent as the specification progresses, are accomplished by the invention, according to which, briefly stated, the method of operating an externally-ignited internal-combustion engine which includes a plurality of engine cylinders each provided with cylinder valves, an ignition device, a fuel injection device and an electromagnetic valve drive for operating the cylinder valves, and which further includes an electronic engine control for controlling the cylinder valves, includes the following steps: monitoring the operation of the ignition device and/or the fuel injection device of each cylinder; and, during cold start and/or when a spark failure and/or an injection failure is detected in one of the cylinders during the monitoring step, adapting the control of the electromagnetic valve drives of that cylinder to the changed operational conditions.

Since both the fuel injection device and the occurrence of spark failures are monitored, the engine control may react to make suitable adaptations.

In case of a spark failure, the affected cylinder is filled with an air/fuel mixture which in the normal operational cycle would be driven uncombusted into the exhaust gas system. In an internal-combustion engine having an exhaust gas catalyst, particularly a regulated exhaust gas catalyst, such an occurrence may cause not only an overheating of the catalyst system but also an erroneous measurement by the regulating device of the exhaust catalyst takes place which, by means of a lambda-probe detects an erroneous value for a fuel excess in the exhaust gas, thus changing the fuel supply for the other, correctly operating cylinders.

In case of an injection failure, air instead of exhaust gas is driven into the exhaust system from the affected cylinder, so that the lambda-probe of the regulating device of the exhaust gas catalyst detects an excessive amount of oxygen in the exhaust gas and then, for the remaining, correctly operating cylinders the fuel supply is increased and thus the mixture is enriched which may be disadvantageous for the catalyst and may lead to increased pollutant emissions.

This method may find application in cold-starting conditions to increase the injected fuel quantities. As a result, a more favorable design of the fuel injection nozzle may be obtained. A fuel injection nozzle should normally be designed such that it is capable of delivering the required cold start fuel quantities. When using the method according to the invention, however, the nozzle may be designed in a more advantageous manner since the quantity spread has to be designed only for a normal engine operation. In such a cold-starting strategy the ignition may remain switched off in the "first" second stroke or an ignition may be attempted, so that in case of success, an additional injection may be dispensed with.

According to a modification of the method for a cold start of the engine, the intake port may remain closed for a further one-half or entire work cycle, so that particularly in the first work cycle a sufficient excess starting quantity is made available. Since such a method is used for all the cylinders of the internal-combustion engine in the start phase, the insertion of a half stroke for synchronizing by empty strokes may also be dispensed with.

The method according to the invention thus advantageously utilizes the fact that in electromagnetic valve drives coupled with an electronic engine control the control of the cylinder valves is fully variable, that is, by means of the electronic engine control not only the valve operating times may be varied in the usual manner for adapting them to the different load conditions but, according to requirements, for the individual cylinders an individual control may be effected as well. If the engine control recognizes a combustion failure based on a spark failure, then by means of the engine control the exhaust valves of the affected cylinder may be maintained closed. Then, in the subsequent work cycle ignition is again attempted with the "old" mixture (charge). At the same time, the fuel injection device of the affected cylinder is shut off for the respective work cycle. Should the ignition be successful, the operation may continue in a normal manner. If the ignition does not succeed, a displacement of the mixture from the cylinder into the exhaust gas system must be considered. In case of a multiple failure the possibility is also provided to expel the mixture in doses in a switched-off state of the fuel injection system. Thus, particularly in case of a large charge introduced into the cylinder for full load or partial load conditions, the exhaust valves are controlled such that the doses of the charge are released by distributing them over several work cycles. In this manner a high stress on the catalyst is avoided.

In case a combustion does not occur because of an injection failure, then, during the upward motion of the piston, the intake valve is opened instead of the exhaust valve and the air contained in the cylinder is driven back into the intake port, so that a new dose of fuel may be injected into the returned air to obtain a combustion mixture. This measure prevents unintended air from gaining access to the exhaust gas system, and prevents the lambda-probe of the exhaust catalyst regulator from emitting a false signal concerning the exhaust gas composition which would lead to an increase of the fuel supply to the other cylinders for incorrectly enriching the air/fuel mixture. In case the injection to a cylinder misses several times consecutively, the engine control may immobilize the cylinder valves of the affected cylinder entirely or set only the gas outlet valves in a half-open position and, at the same time, shut off the fuel injection device of that cylinder, so that the internal-combustion engine only operates on the remaining cylinders. With a suitable design of the engine control, the idling state of one cylinder may be compensated for to a certain degree, so that the internal-combustion engine still operates with a sufficient power, for example, by changing the control times of the valves of the other cylinders to thus ensure a larger charge for each cylinder.

The method according to the invention is expediently so designed that the engine control applies, to the regulating device of the exhaust catalyst, a setting signal which serves for affecting the catalyst regulation and which is differentiated according to the respective failure event (spark failure or injection failure). In this manner, the lambda-probe regulation is "informed" about the respective control strategy of the engine control and is affected in such a manner that for the regulation of the catalyst, an introduction of uncombusted mixtures into the exhaust system in case of spark failure or an introduction of unintended air into the exhaust system in case of injection failure is taken into consideration. This will ensure that the fuel supply to the other cylinders is not rendered erroneously lean or rich by changing the fuel supply.

BRIEF DESCRIPTION OF THE DRAWINGS

The Figures schematically show a cylinder of a four-stroke Otto-engine for different operational modes.

FIG. 1 illustrates an engine cylinder in eight operational states showing two consecutive cycles in normal operation.

FIG. 2 illustrates an engine cylinder in eight operational states showing two consecutive cycles, where a spark failure occurs in the first cycle.

FIG. 3 illustrates an engine cylinder in eight operational states, showing insertion of an extra stroke in case of a spark failure.

FIG. 4 illustrates an engine cylinder in eight operational states, showing the expulsion of uncombusted mixture from the cylinder in doses.

FIG. 5 illustrates an engine cylinder in eight operational states showing two consecutive cycles, where an injection failure occurs in the first cycle.

DESCRIPTION OF THE PREFERRED EMBODIMENTS

In the Figures the arrows indicate the direction of gas flow, the injection device is indicated by a nozzle symbol with jet emission while the ignition device is symbolized by a spark (flash). In case of failure, the respective symbol is crossed out.

FIG. 1 shows a cylinder in normal operation in two consecutive work cycles. In the first stroke an intake of the air/fuel mixture occurs. In the second stroke compression with ignition takes place. In the third stroke combustion occurs while energy is applied to the piston and thus to the crankshaft. In the fourth stroke the combusted mixture is expelled from the cylinder. Thereafter, the strokes are repeated in the subsequent work cycle.

FIG. 2 illustrates the application of the process according to the invention in case spark failure occurs. If in the second stroke of the first work cycle no ignition takes place (spark failure), then in the fourth stroke the mixture is not expelled into the exhaust system but all valves, that is, the gas intake valves and the exhaust valves, are maintained closed so that the mixture remains in the combustion chamber. During the second stroke of the subsequent work cycle ignition is again attempted so that, in case of success, the normal cycle may continue.

In a process modification according to FIG. 3, in contrast to the process according to FIG. 2, as early as during the next upward motion of the piston, that is, in the intended fourth stroke, the exhaust valve is maintained closed so that the mixture, similarly to a second work stroke, is again compressed and ignition is again attempted, with a changed ignition time, if necessary. If such an ignition leads to combustion, then the operation may immediately continue. In such a case the mixture is combusted so that the exhaust composition is not changed by an uncombusted fuel. In such a procedure, to be sure, there appears, with respect to the other cylinders, a stroke shift in the work cycle. It is therefore expedient to insert two empty strokes, that is, an upward and a downward motion of the piston without any other function. Then subsequently, for the respective cylinder the work cycle may be again synchronized with the other cylinders. If again a second spark failure occurs, during such a period a third attempt may follow. During these repeated ignition attempts the fuel injection is shut off for the affected cylinder to prevent a fuel accumulation at the intake valve to thus avoid, for the subsequent, operational (functional) work stroke, a cylinder charge which would not only contain an increased fuel component but in which, because of the fuel accumulations in the mixture intake region, such an enriched mixture would not be well prepared.

In case of spark failure, FIG. 4 shows the possibility of avoiding catalyst damage by expelling the detected and unavoidable uncombusted mixture from the affected cylinder in small doses, distributed over several cycles. If, for example, in accordance with the process shown in FIG. 3, with an inserted extra stroke in the inserted "second stroke" again a spark failure is detected, then while shutting off the fuel supply to that cylinder, during the successive upward motions of the piston the exhaust valves are opened for a shorter period and the uncombusted charge is expelled into the exhaust system in two small doses.

FIG. 5 illustrates the method according to the invention in case of injection failure. In case such a failure is detected in a work stroke, then in the fourth stroke the cylinder charge, instead of being driven into the exhaust system, is driven back into the intake port. In this manner the possibility is provided to attempt a new fuel injection. In case an injection failure is detected prior to the first ignition attempt, then an ignition attempt may be dispensed with.

For the monitoring of spark failures as well as for monitoring injection failures, the course of the current may be detected in the ignition system and in the electric drives which, as a rule, operate the ignition devices. The association of the corresponding ignition device or the corresponding fuel injection device with a cylinder is readily obtained by the engine control which, in turn, is controlled by a suitable signal transmitter positioned at the crankshaft.

The process according to the invention may find application in all types of fuel injection, such as a direct injection or a "central" injection.

It will be understood that the above description of the present invention is susceptible to various modifications, changes and adaptations, and the same are intended to be comprehended within the meaning and range of equivalents of the appended claims.

What is claimed is:

1. A method of operating an externally-ignited internal-combustion engine including a plurality of engine cylinders each provided with cylinder valves, an ignition device and a fuel injection device and an electromagnetic valve drive for operating the cylinder valves, further including an electronic engine control for controlling the cylinder valves; the method comprising the following steps:
   (a) monitoring the operation of the ignition device of each cylinder and the fuel injection device of each cylinder; and
   (b) when a spark failure and an injection failure are detected in one of the cylinders during the monitoring step, adapting the control of the electromagnetic valve drives of said one cylinder to the changed operational conditions.

2. The method as defined in claim 1, wherein said adapting step comprises the following steps:
   (a) upon detecting a spark failure during said monitoring step, maintaining closed the cylinder valves of said one cylinder during a work cycle in which said spark failure is detected;
   (b) shutting off the fuel injection device for said one cylinder during a consecutive work cycle; and
   (c) attempting ignition during said consecutive work cycle without charge replacement in said one cylinder.

3. A method of operating an externally-ignited internal-combustion engine including a plurality of engine cylinders each provided with cylinder valves, an ignition device and a fuel injection device and an electromagnetic valve drive for operating the cylinder valves, further including an electronic engine control for controlling the cylinder valves; the method comprising the following steps:
   (a) monitoring the operation of one of the ignition device of each cylinder and the fuel injection device of each cylinder; and
   (b) when a spark failure is detected in one of the cylinders during the monitoring step, adapting the control of the electromagnetic valve drives of said one cylinder to changed operational conditions; said adapting step comprising the steps of
      (1) maintaining closed the cylinder valves of said one cylinder during a work cycle in which said spark failure is detected; and
      (2) shutting off the fuel injection device for said one cylinder during a consecutive work cycle.

4. The method as defined in claim 3, wherein step (b) further comprises the step of attempting ignition during said consecutive work cycle without charge replacement in said one cylinder.

5. A method of operating an externally-ignited internal-combustion engine including a plurality of engine cylinders each provided with cylinder valves, an ignition device and a fuel injection device and an electromagnetic valve drive for operating the cylinder valves, further including an electronic engine control for controlling the cylinder valves; the method comprising the following steps:
   (a) monitoring the operation of one of the ignition device of each cylinder and the fuel injection device of each cylinder; and
   (b) when a spark failure is detected in one of the cylinders during the monitoring step, adapting the control of the electromagnetic valve drives of said one cylinder to changed operational conditions; upon detecting multiple spark failures during the monitoring step, said adapting step comprising the step of driving the uncombusted cylinder charge from said one cylinder to an exhaust system by repeatedly briefly opening an exhaust valve of said one cylinder during at least one successive work cycle of the engine.

6. A method of operating an externally-ignited internal-combustion engine including a plurality of engine cylinders each provided with cylinder valves, an ignition device and a fuel injection device and an electromagnetic valve drive for operating the cylinder valves, further including an electronic engine control for controlling the cylinder valves; the method comprising the following steps:
   (a) monitoring the operation of one of the ignition device of each cylinder and the fuel injection device of each cylinder; and
   (b) when one of a spark failure and an injection failure is detected in one of the cylinders during the monitoring step, adapting the control of the electromagnetic valve drives of said one cylinder to changed operational conditions; said adapting step comprising the step of applying by the engine control to a regulating device of an exhaust gas catalyst of the internal-combustion engine a setting signal differentiated in accordance with the respective failure for affecting the regulation of the catalyst.

7. A method of operating an externally-ignited internal-combustion engine including a plurality of engine cylinders each provided with cylinder valves, an ignition device and a fuel injection device and an electromagnetic valve drive for operating the cylinder valves, further including an electronic engine control for controlling the cylinder valves; the method comprising the following steps:
   (a) monitoring the operation of one of the ignition device of each cylinder and the fuel injection device of each cylinder; and
   (b) when an injection failure is detected in one of the cylinders during the monitoring step, adapting the control of the electromagnetic valve drives of said one cylinder to changed operational conditions; said adapting step comprising a step of driving back air from said one cylinder into an intake port thereof during an exhaust stroke by opening an intake valve while maintaining an exhaust valve closed.

8. A method of operating an externally-ignited internal-combustion engine including a plurality of engine cylinders each provided with cylinder valves, an ignition device and a fuel injection device and an electromagnetic valve drive for operating the cylinder valves, further including an electronic engine control for controlling the cylinder valves; the method comprising the following steps;
   (a) monitoring the operation of one of the ignition device of each cylinder and the fuel injection device of each cylinder; and
   (b) when an injection failure is detected in one of the cylinders during the monitoring step, adapting the control of the electromagnetic valve drives of said one cylinder to changed operational conditions; said adapting step comprising a step of de-energizing the electromagnetic valve drives of the cylinder valves of said one cylinder.

* * * * *